No. 683,131. Patented Sept. 24, 1901.
E. VON MARSÓVSZKY.
HORSESHOE.
(Application filed Aug. 17, 1899.)
(No Model.)

Witnesses
A. E. Melhuish
A. C. Mitchell

Inventor
Emerich von Marsóvszky
per Jo. E. Madden
Attorney.

THE NORRIS PETERS CO., PHOTO-LITHO., WASHINGTON, D. C.

UNITED STATES PATENT OFFICE.

EMERICH VON MARSÓVSZKY, OF BUDAPEST, AUSTRIA-HUNGARY.

HORSESHOE.

SPECIFICATION forming part of Letters Patent No. 683,131, dated September 24, 1901.

Application filed August 17, 1899. Serial No. 727,588. (No model.)

*To all whom it may concern:*

Be it known that I, EMERICH VON MARSÓVSZKY, a subject of the Emperor of Austria-Hungary, residing at Bulyovszkyutcza 23, Budapest VII, Austria-Hungary, have invented certain new and useful Improvements in Horseshoes, of which the following is a specification.

The known disadvantages of the ordinary horseshoes fastened to the hoof by a number of nails have for a long time led to efforts to design a horseshoe which can be easily taken off and exchanged. This is desirable for many reasons. The nailing on of the shoe always materially weakens the hoof. Further, the horseshoe is worn out more rapidly than the hoof grows, so that in nailing on the former holes frequently have to be used. Most diseases of the hoof result from the nailing on, which latter also always requires the assistance of an expert shoeing-smith, which assistance cannot always be obtained.

On observing the step of an unshod horse it will be found that when the hoof is planted upon the ground it extends laterally—that is to say, becomes broader—and reassumes its original shape again when the hoof is raised. This change of form, which takes place at every step, is a circumstance requiring special construction of the horseshoe. The shoe ought to permit the said change of form. As long as this condition is not fulfilled any method of fastening the shoe is unsuitable.

In the horseshoe to which the present invention relates projections of the said shoe engage or dovetail with supporting parts fastened to the hoof in such a manner that lateral expansion of the hoof can take place on same being planted upon the ground, and secure connection between the projections and the supporting parts is possible.

In the annexed drawings one form of the new horseshoe is represented as an example.

Figure 1:
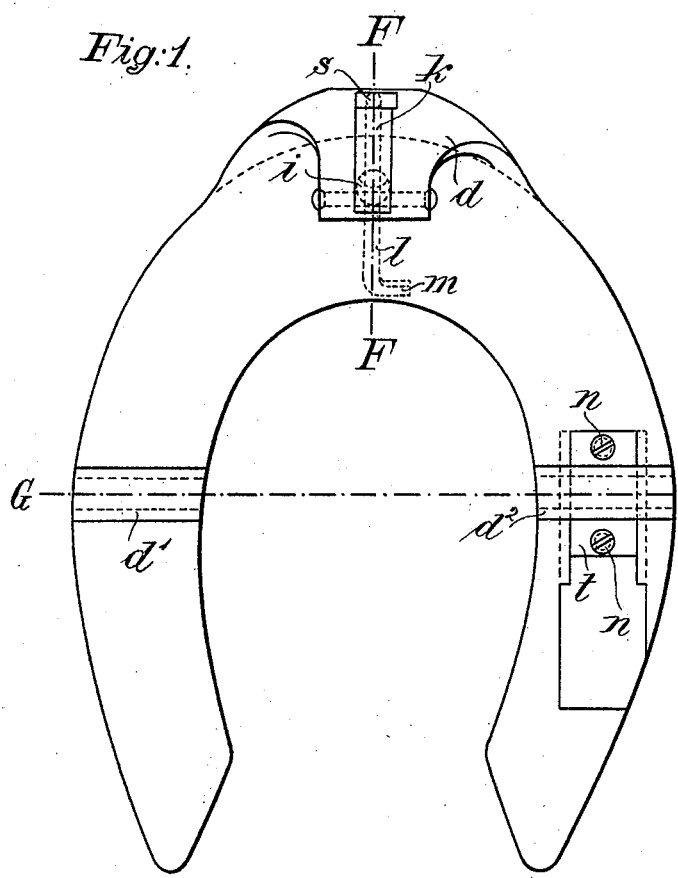
Figure 2:
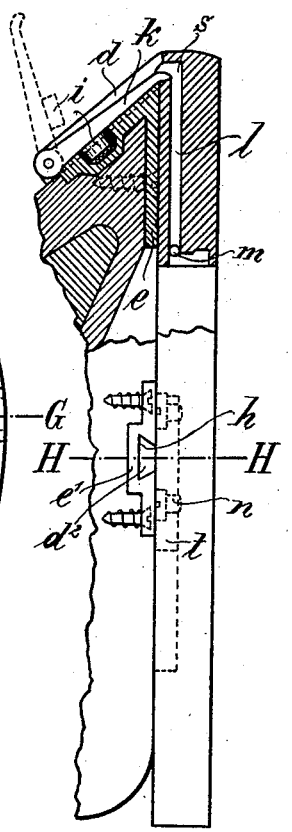
Figure 3:
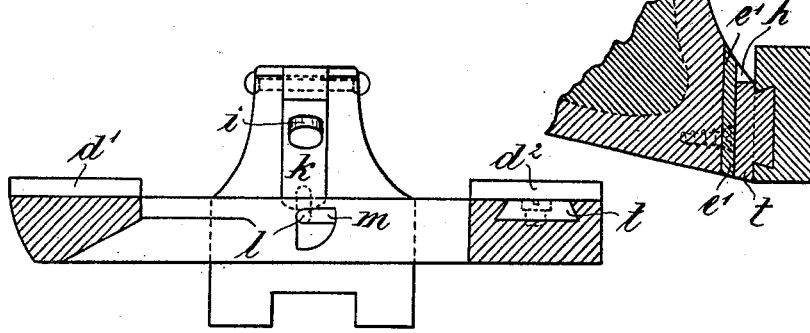
Figure 4:
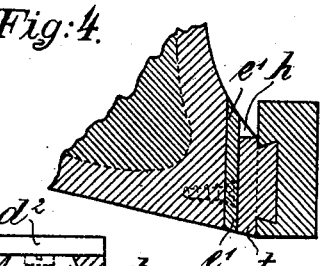

Figure 1 is a plan view; Fig. 2, a section on the line F F in Fig. 1; Fig. 3, a section on the line G G in Fig. 1, and Fig. 4 a section on the line H H in Fig. 2.

In the form of construction represented in the drawings two oppositely-placed supporting parts $e'$ have dovetail-like guides or slots $h$ transverse to the hoof, in which slots the dovetail projections $d'$ $d^2$ on the upper faces of the sides of the shoe can slide. As the central line of the guide projections lies in the same direction as the hoof expansion, it follows that the said expansion is not hindered. To prevent the shoe from sliding off laterally, a catch $k$, with a projecting boss $i$, is pivoted to the toe-cap $d$ of the shoe, Figs. 2 and 3. The said boss $i$ enters a suitable recess in the support $e$ in front of the hoof, and thus prevents the slipping off of the shoe. In order to prevent the undesired detachment of the catch $k$, some suitable safety device can be provided. In the example represented herewith the said safety device consists of a bar $l$ and having its end revolving around its longitudinal axis and bent sidewise. The said bar is let into the body of the shoe and when turned holds the end of the catch $k$ by means of its hooked end $s$. To open the safety device, the arm $m$ of the bar $l$ is turned sidewise, so that the hook $s$ turns laterally from in front of the catch $k$. On the latter being opened the shoe can be taken off by sliding it sidewise from the hoof.

In order to adapt the shoe to different sizes of hoof and with a view to the growing of the latter, the projections $d'$ $d^2$ can be made adjustable in the direction of length of the shoe, as shown in the drawings, by the sliding piece $d^2$ being made separately from the shoe and integral with a plate $t$, adapted to slide in a suitable groove in the shoe and adapted to be fastened in place by means of screws $n$.

I declare that what I claim is—

1. The combination with supports adapted to be fastened to the hoof, of a horseshoe having projections adapted to slidingly dovetail with said supports fastened to the hoof in such a manner as to permit of lateral expansion of the hoof, and means for securing the connection between the said projections and the said supports.

2. The combination with supports $e'$ adapted to be fastened to the hoof and having dovetail slots $h$ in a direction transverse to the hoof, of a horseshoe having dovetail projections $d'$ $d^2$ adapted to engage in said slots, and means at the toe for securing the shoe against lateral sliding upon the hoof, substantially as and for the purpose described.

In witness whereof I have signed this specification in the presence of two witnesses.

EMERICH VON MARSÓVSZKY.

Witnesses:
 PAUL BOLUKEY,
 LABO BAIER.